US008834167B2

(12) United States Patent
Spotts

(10) Patent No.: US 8,834,167 B2
(45) Date of Patent: Sep. 16, 2014

(54) MANIPULATIVE FOR MODELING QUANTITATIVE CONCEPTS

(76) Inventor: Barbara Spotts, Shamokin, PA (US)

( * ) Notice: Subject to any disclaimer, the term of this patent is extended or adjusted under 35 U.S.C. 154(b) by 320 days.

(21) Appl. No.: 13/177,547

(22) Filed: Jul. 6, 2011

(65) Prior Publication Data

US 2012/0006250 A1 Jan. 12, 2012

Related U.S. Application Data

(60) Provisional application No. 61/361,905, filed on Jul. 6, 2010.

(51) Int. Cl.
*G09B 1/00* (2006.01)
*G09F 7/04* (2006.01)
*G09F 7/02* (2006.01)

(52) U.S. Cl.
CPC ... *G09F 7/04* (2013.01); *G09F 7/02* (2013.01)
USPC .......................................................... 434/195

(58) Field of Classification Search
USPC ......... 434/188, 191, 192, 195, 196, 205, 209, 434/211, 214
See application file for complete search history.

(56) References Cited

U.S. PATENT DOCUMENTS

| | | | | | |
|---|---|---|---|---|---|
| 2,705,843 | A | * | 4/1955 | Hawkins | 434/196 |
| 3,204,344 | A | * | 9/1965 | McMeen | 434/196 |
| 3,410,002 | A | * | 11/1968 | Mulholland et al. | 434/195 |
| 4,144,657 | A | * | 3/1979 | Dumovich | 434/187 |
| 5,366,378 | A | * | 11/1994 | Johannsen et al. | 434/187 |
| 5,421,732 | A | * | 6/1995 | Taylor | 434/195 |
| 5,470,234 | A | * | 11/1995 | Sher | 434/196 |
| 5,597,308 | A | * | 1/1997 | Woldenberg et al. | 434/196 |
| 5,599,188 | A | * | 2/1997 | Lemos Melendez | 434/195 |
| 6,575,754 | B2 | * | 6/2003 | Salvo | 434/195 |
| 6,575,755 | B2 | * | 6/2003 | Dreyfous | 434/196 |
| 6,926,530 | B2 | * | 8/2005 | Frieman | 434/191 |
| 7,104,799 | B1 | * | 9/2006 | Sansing | 434/195 |
| 7,677,895 | B2 | * | 3/2010 | Miller | 434/188 |
| 7,909,608 | B2 | * | 3/2011 | Zhou | 434/188 |
| 2008/0064015 | A1 | * | 3/2008 | Garmirian | 434/211 |
| 2008/0108030 | A1 | * | 5/2008 | Bayne | 434/188 |
| 2009/0023121 | A1 | * | 1/2009 | Zhou | 434/188 |

* cited by examiner

*Primary Examiner* — Kurt Fernstrom
(74) *Attorney, Agent, or Firm* — Fox Rothschild LLP

(57) ABSTRACT

A manipulative for modeling quantitative concepts, said manipulative comprising a flat, marking surface, said marking surface having a linear track with a defined start and end point representing a quantity to be measured therebetween, and a plurality of loose articles which can be placed upon the track representing segments of said quantity to be measured.

14 Claims, 5 Drawing Sheets

1 minute time piece 1 minute time piece 5 minute time piece 15 minute time piece 30 minute time piece 1 hour time piece

MANIPULATIVE FOR MODELING QUANTITATIVE CONCEPTS

CROSS-REFERENCE TO RELATED APPLICATIONS

The present application claims benefit under 35 U.S.C. §119(e) to U.S. Provisional Patent Application Ser. No. 61/361,905, filed on Jul. 6, 2010. The contents of the foregoing application is hereby incorporated by reference in its entirety.

FIELD OF THE INVENTION

The present application relates to manipulatives and modeling methods using manipulatives for modeling quantitative concepts, such as elapsed time.

BACKGROUND OF THE INVENTION

Quantitative concepts can be particularly frustrating to model and demonstrate, especially concepts such as elapsed time. One manipulative that attempts to obviate the hurdles of teaching elapsed time is the geared analog clock, which has hands that users can manipulate. While the product is effective for demonstrating a specific time, i.e., teaching the telling of time, it can be particularly confusing for students to visualize and calculate elapsed time as every full 360 degree rotation of the minute hand causes the hour hand to rotate 30 degrees.

Another manipulative currently available is a set of disks and fractional components of a disk, which represent units of time, and a circular board in which the disks can be inserted, the board being representative of an analog clock. The manipulative, however, is limited to showing elapsed time of an hour or less, and does not allow a user to choose a start and end point.

Yet another manipulative currently available is a double-sided magnetic board, which is marked with predetermined intervals of time on the board, and a plurality of rectangular magnetic pieces that are representative of time. One side of the board is representative of a.m., while the other side is representative of p.m. The board, however, does not allow users to easily transition from a.m. to p.m., as the board must be turned over.

SUMMARY OF THE INVENTION

In one aspect, the present invention provides a manipulative for modeling quantitative concepts, in which a flat marking surface is provided having a linear track with a defined start and end point representing a quantity to be measured therebetween, and a plurality of loose articles which can be placed upon the track representing segments of said quantity to be measured.

In one embodiment, the flat marking surface is disposable paper, chip board or cardboard.

In a preferred embodiment, the flat marking surface is an erasable plastic surface. Even more preferable, the erasable plastic surface is transparent.

In another preferred embodiment, the flat marking surface is an erasable plastic surface. Even more preferable, the erasable plastic surface is transparent.

In another most preferred embodiment, the flat marking surface is an erasable plastic surface and the loose articles comprise planar, circular sectors having central angles of 6 degrees, 30 degrees, 90 degrees, 180 degrees, and 360 degrees.

In another embodiment, the flat marking surface is an erasable plastic surface and the loose articles are displayed on a personal computer or lap top or displayed to an entire class on an interactive whiteboard system In another aspect, the present invention provides a method for modeling quantitative concepts using the manipulative described herein. More particularly, a method for modeling elapsed time using the preferred embodiment of the present invention is provided. Methods for modeling making change to be refunded when making a purchase, modeling differences resulting from addition or subtraction, and modeling fractional values are also provided.

DETAILED DESCRIPTION OF THE INVENTION

Figure 1:
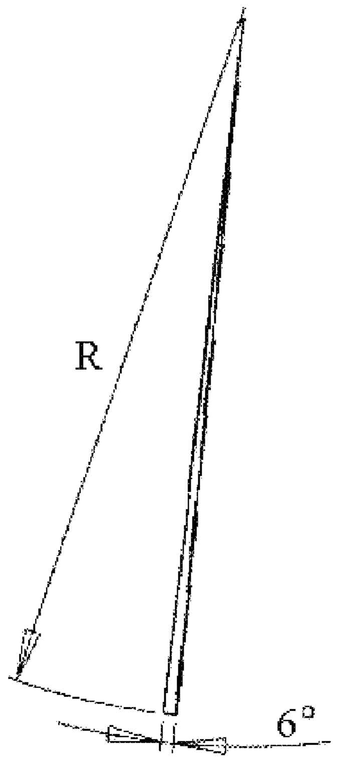
FIG. 1 illustrates a loose article representative of 1 minute of elapsed time, which can be placed upon the track of the marking surface of the manipulative described in the present invention.
Figure 2:
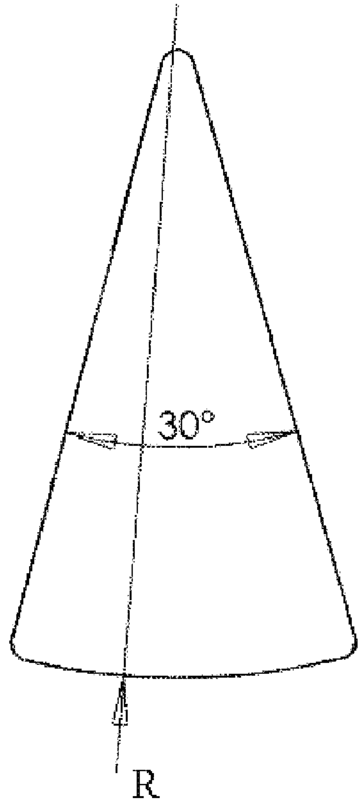
FIG. 2 illustrates a loose article representative of 5 minutes of elapsed time, which can be placed upon the track of the marking surface of the manipulative described in the present invention.
Figure 3:
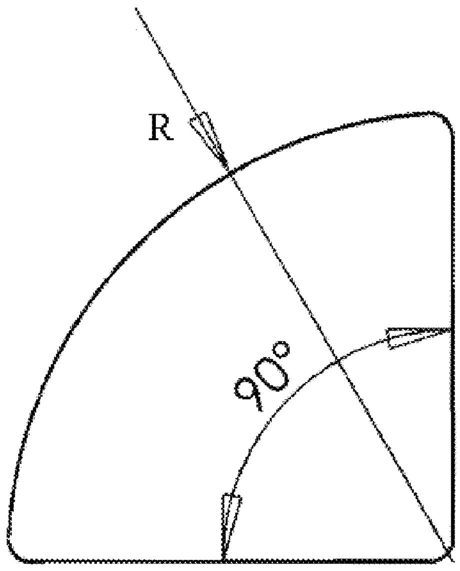
FIG. 3 illustrates a loose article representative of 15 minutes of elapsed time, which can be placed upon the track of the marking surface of the manipulative described in the present invention.
Figure 4:
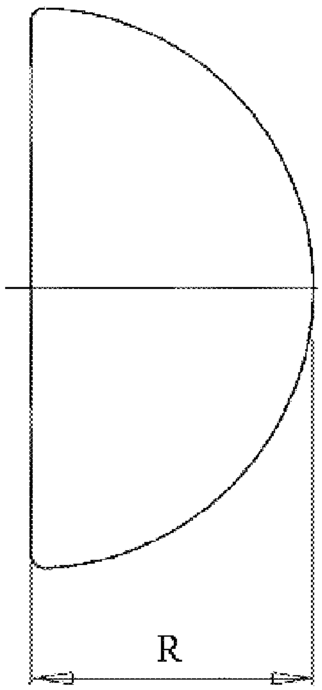
FIG. 4 illustrates a loose article representative of 30 minutes of elapsed time, which can be placed on the marking surface of the manipulative described in the present invention.
Figure 5:
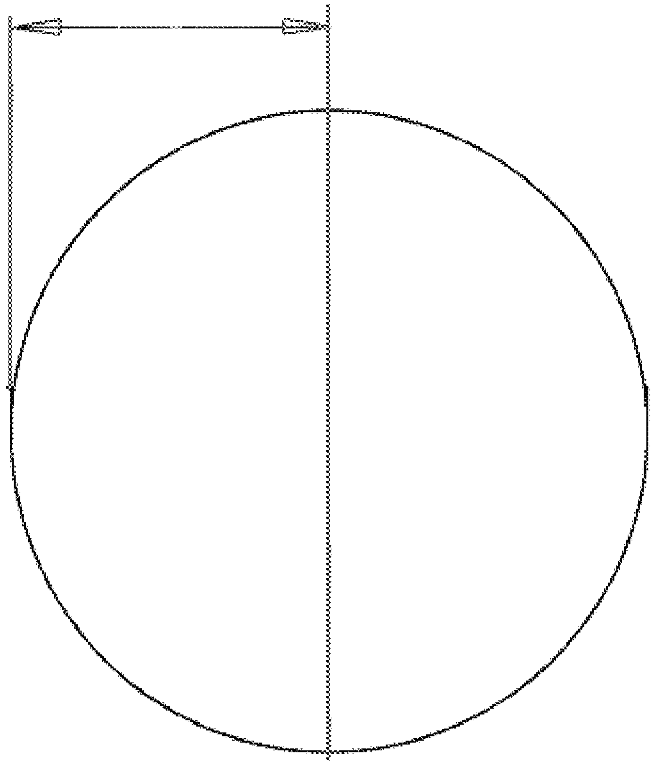
FIG. 5 illustrates a loose article representative of 1 hour, or 60 minutes, of elapsed time, which can be placed upon the track of the marking surface of the manipulative described in the present invention.
Figure 6:
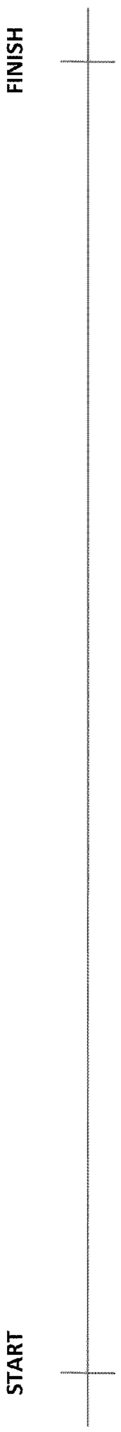
FIG. 6 illustrates the track as it would appear on the marking surface of the present invention.

The present invention provides a manipulative for modeling quantitative concepts, and, more particularly, elapsed time. The manipulative comprises a flat marking surface having a linear track with a clearly defined start and end point, and a plurality of loose articles which can be placed upon the marking surface. The marking surface is configured to allow the instructor or student to designate and write in a start time and an end time for calculation of the elapsed time therebetween. The elapsed time can range from several minutes to several hours to several days and can traverse from a.m. to p.m. or vice versa.

The marking surface may be disposable paper, chip board or cardboard, or it can be a flat, erasable marking surface. Flat, erasable marking surfaces are preferred because they can be easily re-used. The marking surface and articles can also be virtually represented on a computer. The computer representation can be displayed on a personal computer or lap top or displayed to an entire class on an interactive whiteboard system such as a SMART BOARD™. Such marking surfaces are readily available and known in the art. Non-limiting examples of flat, erasable marking surfaces include laminated paper, dry-erase boards, or transparency sheets used with overhead projectors.

In a preferred embodiment, the plurality of loose pieces are proportional circular sectors that have central angles of 6 degrees, 30 degrees, 90 degrees, 180 degrees, and 360 degrees, and are representative of the distance traveled on a clock face by the hands of a clock. For example, a circular sector having a central angle of 6 degrees, which is one-sixtieth of a full rotation, can be representative of the movement of a minute hand of a clock during the passage of one minute. A circular sector having a central angle of 30 degrees, which is one-twelfth of a full rotation, can be representative of the movement of a minute hand of a clock during the passage of 5 minutes or the hour hand of a clock and represent passage of one hour. Likewise, the full circle can represent the movement of the minute hand of a clock during the passage of an hour or the hour hand of a clock during the passage of 12 hours, and so forth. Other articles, preferably of a different shape, may represent larger quantities of time, such as days, weeks, months, years, etc.

Instruction of quantitative concepts, such as elapsed time, utilizing the manipulative of the present invention, is shown in the following example:

A student is asked to determine the amount of time elapsed between 8:30 AM and 10:15 AM. The student would then record the start and end time on the track. Next, The articles are selected to represent the quantity of time that has passed. After recording the start and end time, the student may then select and assemble any combination of the loose articles along the track to represent segments of the elapsed time. The assembly of segments is built according to the segments of time conceptualized by the student. The total value of the time represented by the articles placed on the track represents the elapsed time.

For example, the student may select a half circle and then denote that this represents the passage of time from 8:30 to 9:00. The student may then select a full circle and denote that this represents the passage of time from 9:00 to 10:00. Finally the student may select a quarter-circle and denote that this represents the passage of time from 10:00 to 10:15. The student then calculates the total elapsed time by adding up the quantities of time each article represents.

Figure 7:
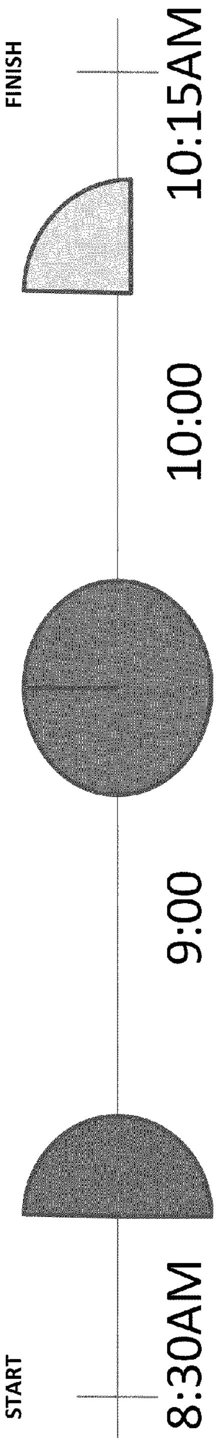
FIGS. 7-9 illustrates various methods of how a student would use the manipulative of the present invention and record information on or near the track to solve a problem involving elapsed time.
Figure 8:
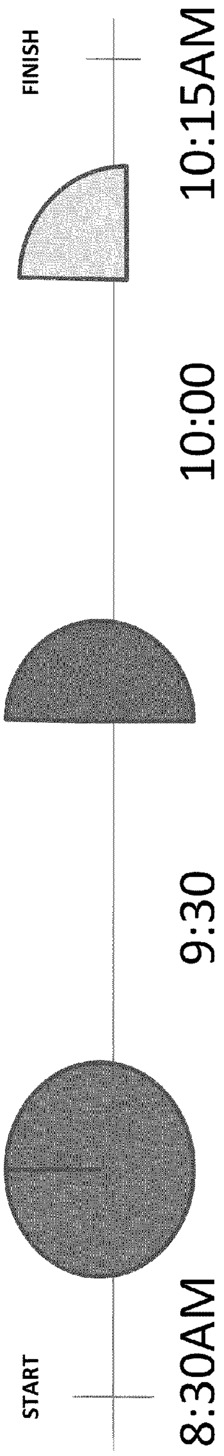
Figure 9:
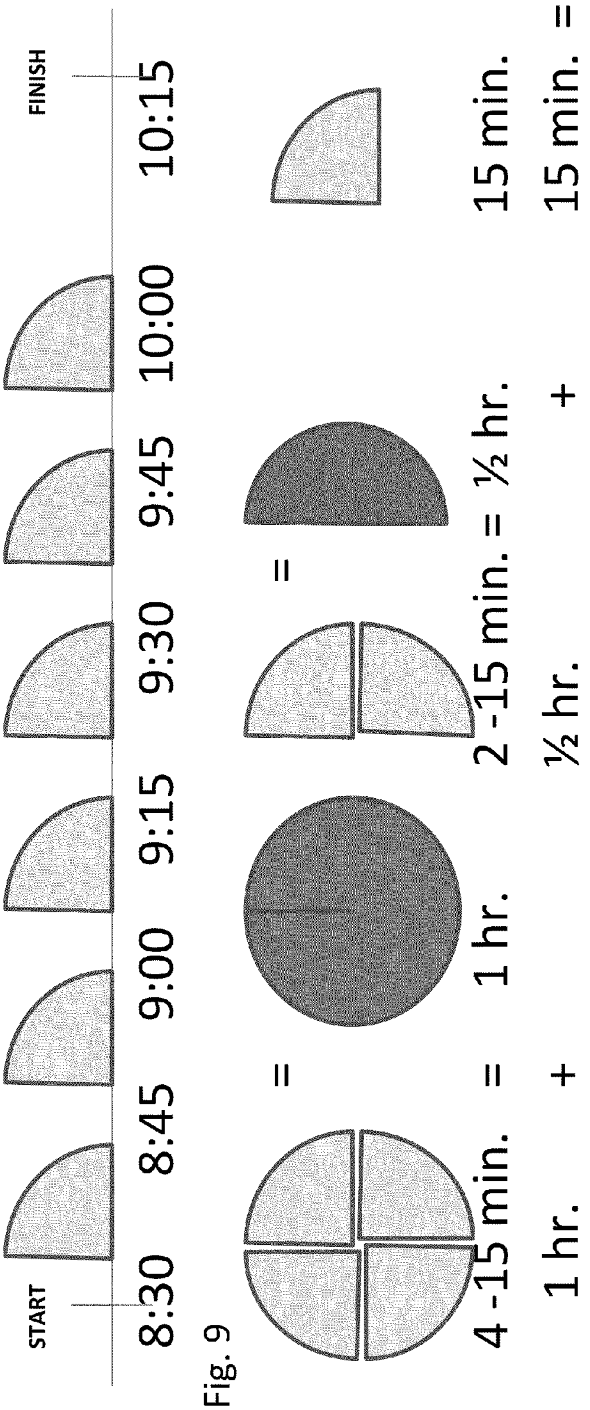
Figure 10:
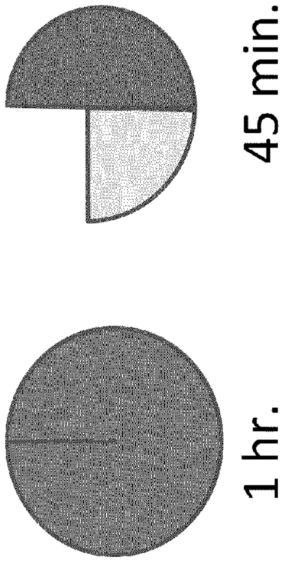
FIG. 10 illustrates the loose articles are proportional to an analog clock relative to the quantity of time it represents.

Several possible approaches are illustrated in FIGS. 7-9. By being able to choose the fractional combinations they prefer, students learn to calculate elapsed time faster, as they are able to approach the calculation from the perspective of how they conceptualize the passage of elapsed time, after which they learn alternative approaches to the calculation. Eventually the student learns that there are a number of combinations of articles that can be used in no particular order to represent and quantify the amount of elapsed time.

The present invention is not limited to modeling the measurement of elapsed time, but can also be used to model other quantitative concepts, such as making change, addition or subtraction (particularly with fractions), and the like. The present invention advantageously enables subtraction to be performed without re-grouping or addition to be performed without carrying.

When measuring elapsed time the circle-shaped article and fractions thereof represent the distance traveled on a clock face by the hands of a clock and the linear track serves as a time line. When modeling making change, the articles represent coin fractions of a monetary unit and the linear track serves as a money track. And when modeling addition or subtraction, the articles are base ten blocks representing ones units, tens units, hundreds units, and the like, and the linear track serves as a number line.

While the principles of this invention have been made clear in an illustrative embodiment, there will be many modifications of structure, arrangement, proportions, the elements, materials and components used in the practice of the invention that are immediately obvious to those skilled in the art. The invention in its broader aspects is therefore not limited to the specific details, and illustrative examples shown and described. Accordingly, departures may be made from such details without departing from the spirit or scope of the present invention.

What is claimed is:

1. A manipulative for modeling quantitative concepts comprising:

an erasable flat marking surface having a linear track with designated start and end points and no unit markings between the two points, wherein said flat marking surface is configured to provide space to record a starting quantity and an ending quantity and a quantity to be measured therebetween; and a plurality of loose articles which can be placed upon said track representing segments of said quantity to be measured, wherein said linear track is positioned on said surface to provide sufficient room for said articles to be placed thereon, with enough space remaining above or below said linear track to record the incremental increases in the starting quantity represented by each article; and said quantity to be measured is elapsed time, said linear track on said flat marking surface represents a time line and said articles represent units of time.

2. A manipulative for modeling quantitative concepts comprising:

an erasable flat marking surface having a linear track with designated start and end points and no unit markings between the two points, wherein said flat marking surface is configured to provide space to record a starting quantity and an ending quantity and a quantity to be measured therebetween; and a plurality of loose articles which can be placed upon said track representing segments of said quantity to be measured, wherein said linear track is positioned on said surface to provide sufficient room for said articles to be placed thereon, with enough space remaining above or below said linear track to record the incremental increases in the starting quantity represented by each article; and said quantity to be measured is the amount of change to be refunded when making a purchase, said flat marking surface comprises a money track, and said articles represent currency.

3. The manipulative of claim 1, wherein said quantity to be measured is the difference resulting from subtracting one number from another or the sum of adding two numbers, said that marking surface comprise a number line, and said articles comprise articles representing ones units, tens units and hundreds units.

4. The manipulative of claim 3, wherein at least one of said numbers is a fraction.

5. The manipulative of claim 1, wherein said loose articles comprises a set of planar, circular sectors.

6. The manipulative of claim 5, wherein the set of said circular sectors includes circular sectors having a central angle of 6 degrees, 30 degrees, 90 degrees, 180 degrees, and 360 degrees.

7. The manipulative of claim 1, wherein the flat marking surface is disposable paper, chip board or cardboard.

8. The manipulative of claim 1, wherein the flat marking surface is an erasable plastic surface.

9. The manipulative of claim 8, wherein said flat, erasable marking surface is a transparent sheet.

10. A method for modeling quantitative concepts comprising:

(a) providing a flat erasable marking surface comprising a linear track with a designated start and end point and no unit markings between the two points, wherein said flat marking surface is configured to provide space to record a starting quantity and an ending quantity, and a plurality of loose articles, wherein said linear track is positioned on said surface to provide sufficient room for said articles to be placed thereon, with enough space remaining above or below said linear track to record the incremental increases in the starting quantity represented by each article;

(b) assigning values to said loose articles based on the size, shape, color, or any combination thereof;

(c) recording predetermined start and end values on the start and end point of said marking surface;

(d) manipulating the loose articles and record values along the track of the marking surface as required to represent segments of the quantity represented by the difference between said start and end values until all segments are represented by an article; and (e) totaling the value represented by each segment article.

11. The method of claim 10, wherein the quantitative concept is determining elapsed time.

12. The method of claim 10, wherein the quantitative concept is addition or subtraction of two numbers.

13. The method of claim 10, wherein the quantitative concept is calculating the amount of change to be refunded when making a purchase.

14. The method of claim 10, wherein the set of loose articles consists of circular sectors having central angles of 6 degrees, 30 degrees, 90 degrees, 180 degrees, and 360 degrees; and the circular sectors having a central angle of 6 degrees, 30 degrees, 90 degrees, 180 degrees, and 360 degrees are representative of 1, 5, 15, 30, and 60 minutes of elapsed time, respectively.

* * * * *